United States Patent [19]
Kamp et al.

[11] 3,780,632
[45] Dec. 25, 1973

[54] DAYLIGHT MODE COMPENSATING MECHANISM

[75] Inventors: Leonard F. Kamp; Jeffrey R. Stoneham, both of Rochester, N.Y.

[73] Assignee: Eastman Kodak Company, Rochester, N.Y.

[22] Filed: Nov. 24, 1972

[21] Appl. No.: 309,538

[52] U.S. Cl. ............................. 95/11 L, 95/11.5 R
[51] Int. Cl. .......................................... G03b 15/04
[58] Field of Search ...................... 95/11.5 R, 11 L, 95/11 V; 240/1.3; 431/92, 93

[56] References Cited
UNITED STATES PATENTS
3,661,063  5/1972  Beach .............................. 95/11.5 R Primary Examiner—Robert P. Greiner
Attorney—W. H. J. Kline et al.

[57] ABSTRACT

Photographic apparatus having a shutter mechanism and adapted for use with a flash device is provided with a compensating spring for equalizing the force required to actuate the mechanism in the daylight and flash mode.

10 Claims, 4 Drawing Figures

PATENTED DEC 25 1973
3,780,632

DAYLIGHT MODE COMPENSATING MECHANISM

BACKGROUND OF THE INVENTION

1. Field of the Invention

The present invention relates generally to photographic apparatus and in particular to a mechanism for insuring proper actuation of the shutter mechanism in either a daylight or flash mode. 2. Description of the Prior Art In order to overcome various well known problems associated with electrically firable flashlamps, percussively firable lamps have recently been developed. In one form, such lamps have been incorporated into multilamp devices which include a pre-energized striker associated with each lamp. The striker is releasable to impact upon a percussive element associated with each lamp thereby causing firing of the lamp. Such mechanically operable flash devices are characterized by highly reliable actuating systems which are not dependent upon electrical contacts or electrical energy sources.

A firing mechanism must be provided in any photographic apparatus which is to be utilized with a percussively firable flash device of the type described. In one such mechanism, a release member is movable to contact a pre-energized striker and thereafter is movable to cause release of the striker for movement to impact on the percussive element. To cause release of the striker, the firing member must usually extend outwardly of the camera. In order to prevent unnecessary wear of the flash firing mechanism as well as for external camera appearance, mechanisms have been provided for disengaging the firing member from the body release and for retaining the firing member within the camera in the absence of a flash device. Such mechanisms are disclosed in U.S. Pat. Nos. 3,677,157 and 3,646,864. However, when the firing member is disengaged from operative relationship with the body release, the operator will be required to exert a different force on the body release to actuate the camera in the daylight mode. Moreover, in some mechanisms the body release will travel a different distance for daylight and flash mode operation. In either circumstance, improper operation of the camera may result because of the different requirements for proper actuation of the camera in the daylight and flash modes.

SUMMARY OF THE INVENTION

Accordingly, it is an object of the present invention to provide an improved mechanism which insures proper actuation of a shutter mechanism.

Another object of the present invention is to provide such an improved mechanism which disables the flash firing mechanism and increases the force required to actuate the shutter during daylight mode operation to compensate for disabling of the flash firing mechanism.

Still another object of the present invention is to provide an improved mechanism including a compensating member for simulating the force requirements for flash actuation during daylight mode operation.

These and other objects are accomplished according to the present invention by a shutter operating and flash firing mechanism including a compensating member engageable with the mechanism during daylight mode operation to simulate flash firing. The compensating mechanism comprises a compensating spring mounted on a release lever and a compensating lever movable into contact with the compensating spring in the absence of a flashlamp. Contact between the compensating spring and lever provides a force during daylight mode operation which simulates the force required to release the pre-energized striker associated with a flashlamp during flash mode operation.

BRIEF DESCRIPTION OF THE DRAWINGS

In the description of the preferred embodiment of the invention presented below, reference is made to the accompanying drawings in which.

DESCRIPTION OF THE PREFERRED EMBODIMENT

Because photographic cameras are well known, the present description will be directed in particular to elements forming part of, or cooperating more directly with, the present invention. Camera elements not specifically shown or described herein are understood to be selectable from those known in the art.

Figure 1:
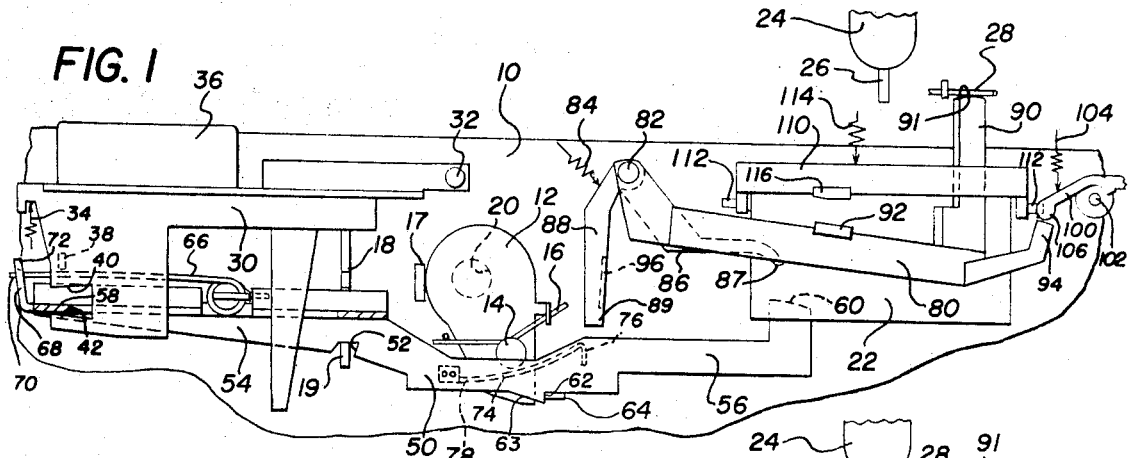
FIG. 1 is a front view of photographic apparatus having a shutter operating and flash firing mechanism and incorporating the daylight mode compensating mechanism of the present invention. A flashlamp is illustrated mounted on the apparatus and in position for firing.

In FIG. 1, photographic apparatus according to this invention is illustrated which is adapted for use with a multilamp flash unit of the type known in the art. The photographic apparatus has been broken away to reveal an inner frame member 10. A shutter blade 12 is rotatably mounted on frame member 10 by means of a fixed pin 14. Shutter blade 12 is biased in a counterclockwise direction by spring 16 into abutment with a stop 17 mounted on frame member 10. In its counterclockwise position, as illustrated, shutter blade 12 is in covering relationship with an aperture 20 shown in phantom in FIG. 1. Frame 10 has integrally formed thereon a raised portion 18 in which is formed a recessed portion 19 for use as a fulcrum. A socket 22 is also mounted on frame member 10. Socket 22 is of the type known in the art which is adapted to receive and releasably hold a multi-lamp flash unit consisting of a plurality of flashlamps 24. Each flashlamp 24 has associated with it a percussive primer element 26 and a pre-energized striker 28, which is releasable for movement into impact with primer element 26 to fire the associated flashlamp 24.

The shutter operating and flash actuating mechanism of the camera comprises a body release 30, a release lever 50, a firing member 80, a signal device 100 and a retracting member 110. Body release lever 30 is movably mounted on frame member 10 by means of a fixed pin 32. Body release 30 is biased in a clockwise direction by a spring 34 so that a release button 36 extends outwardly of the camera body and may be operated by the camera operator. Body release 30 further has integrally formed thereon a lug 38 and upper and lower engaging surfaces 40 and 42.

Release lever 50 defines a recessed portion 52 and is movably mounted on frame member 10 by mating recessed portions 19 and 52, thereby providing a fulcrum for lever 50. Lever 50 is elongated in form and has opposed ends 54 and 56. End 54 terminates in a lug 58 which is selectively engageable by engaging surfaces 40 and 42 on body release 30. End 56 terminates in an upwardly extending drive lug 60. Release lever 50 further defines a latch portion 62 engageable with a high energy lever 64 to maintain high energy lever 64 in its cocked condition and a ramped portion 63. High energy lever 64 is movably mounted within the camera for movement to the left as illustrated in FIG. 1 to engage shutter blade 12 and drive it in a clockwise direction to its aperture uncovering position. Mounted on end 54 of release lever 50 is an elongated spring wire form shutter operating spring 66 having a movable end 70. End 70 is positioned for engagement by lug 38 on body release 30 when body release 30 is rotated by operator contact with button 36. Lever 50 further includes an upright arm 68 ending in a bent-over portion 72 which engages spring end 70 and maintains spring end 70 out of engagement with lug 38. A blade form compensating spring 74 is mounted as a cantilever on release lever 50. One end 78 of spring 74 is fixed to lever 50 while the other end 76 is free to move. Spring 74 could also be mounted at end 76 with end 78 free to move or could take the form of a spiral, wire or other type spring.

Figure 4:
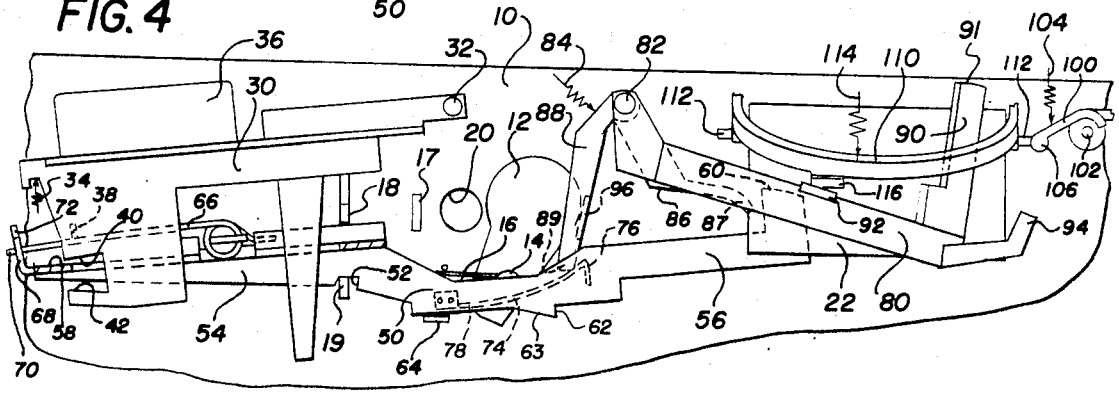
FIG. 4 is a front view of the photographic apparatus of FIG. 3 during actuation of the shutter operating and flash firing mechanism and showing the daylight mode compensating mechanism of the present invention in operation.

Sensing and firing member 80 is rotatably mounted on frame member 10 by a fixed pin 82 and is biased in counterclockwise direction by a spring 84. Sensing and firing member 80 includes an actuating arm 86, a compensating arm 88, a sensing and firing arm 90, a retracting surface 92 and a drive lug 94. Actuating arm 86 terminates in an actuating surface 87 which is engageable by drive lug 60 on release lever 50. Compensating arm 88 terminates in an end 89 which is engageable by compensating spring 74 in daylight mode operation of the camera as illustrated in FIG. 4. Compensating arm 88 further has an integrally formed stop lug 96, shown in phantom. Sensing and firing arm 90 terminates in a sensing and firing end 91 which is movable into engagement with a pre-energized striker 28 associated with a flashlamp 24 which is in firing position. Spring 84 is not strong enough to cause release of a pre-energized striker 28 and thus movement of arm 90 is terminated by contact with a striker 28.

Signal device 100 is rotatably mounted on frame member 10 by a fixed pin 102 and is biased in a counterclockwise direction by a spring 104. Signal device 100 has a drive end 106 and a flag portion (not illustrated) which is positionable within the viewfinder of the camera upon clockwise rotation of device 100.

Retracting member 110 is movably mounted on frame member 10 by means of pins 112. A sleeve (not illustrated) is mounted in the camera to surround socket 22 and the sleeve is urged upward by a spring to bear against the underside of the rear of retracting element 110. The sleeve and its spring are represented schematically by a spring 114 which moves a retracting lug 116 on member 110 into engagement with retracting surface 92 on sensing and firing member 80 in the daylight mode shown in FIG. 3. Retracting member 110 is movable to the position illustrated in FIG. 1 by a T-bar structure (not illustrated) which senses the presence of a multilamp flash unit in socket 22 and moves the sleeve downward against the bias of its spring thereby disengaging lug 116 from surface 92 on member 80 and permitting member 80 to move under the bias of spring 84. Retract member 110 may also be provided with a stop lug for movement into the path of shutter blade 12 when a flash unit is inserted in socket 22.

For operation of the camera in the flash mode, a a multilamp flash unit is inserted in socket 22. The T-bar structure senses the presence of the flash unit and rotates retracting member 110 to the position illustrated in FIG. 1 in which retracting lug 116 is separated from surface 92 on flash sensing and firing member 80. Sensing and firing member 80 moves under the bias of spring 84 until firing end 91 comes into contact with a pre-energized striker 28 of a flashlamp 24. However, the bias of spring 84 is not sufficient to cause release of the pre-energized striker 28.

The camera operator now initiates operation of the camera mechanisms by depressing release button 36 on body release 30, causing counterclockwise rotation of body release 30 until lug 38 comes into engagement with end 70 of shutter spring 66. Motion of body release 30 will be transmitted through spring 66 to release lever 50, causing counterclockwise rotation of lever 50 until drive lug 60 comes into contact with actuating surface 87 on actuating arm 86. Movement of lever 50 now ceases, thereby causing energy to be stored within spring 66 as body release 30 continues to move. However, spring 66 does not store sufficient energy to cause actuation of the flash firing mechanisms. Actuation does not occur until engaging surface 40 comes into engagement with lug 58 on body release lever 50, thereby establishing direct contact between body release 30 and release lever 50. Further movement of body release 30 now directly causes counterclockwise rotation of release lever 50. Continued movement of release lever 50 causes counterclockwise rotation of firing member 80 about fixed pin 82 and subsequent release of a pre-energized striker 28 by means of firing end 91. Upon release of a striker wire, spring 66 expands, causing further rotation of release lever 50 and freeing high energy lever 64 from latch portion 62. High energy lever 64 moves to engage shutter blade 12 and drive it to the aperture uncovering position illustrated in FIG. 2. Stored energy in spring 66 insures shutter and flash synchronization and prevents incomplete camera actuation by the operator.

Shutter blade 12 will be returned to its aperture covering position by means of spring 16 after a predetermined exposure time has elapsed. Alternatively, a stop such as stop lug 96 can be positioned to terminate movement of shutter blade 12, after which blade 12 will move to its closed position under the bias of spring 16. Release of button 36 permits clockwise rotation of body release 30 and lever 50 to their initial positions. However, high energy lever 64 will remain in its uncocked position until film advance and cocking operation of the camera is achieved in any conventional manner. During the cocking operation, high energy lever 64 is returned over ramped portion 63 to engagement with latch portion 62. Lever 50 and body release 30 will remain in their initial positions as illustrated in FIG. 1.

The presence of a fired flashlamp 24 in firing position will be indicated to the operator by means of signal device 100. When retracting member 110 is moved away from engagement with sensing and firing member 80, sensing and firing arm 90 moves into sensing position within the flash device. If sensing and firing arm 91 fails to come into contact with a pre-energized striker wire 28, movement of firing member 80 in a counterclockwise direction continues until engagement of drive lug 94 with drive end 106 causes clockwise rotation of device 100 to position the indicating flag within the viewfinder of the camera. The camera operator may now rotate the flash device until a usable flashlamp 24 is advanced to the firing position in which case sensing and firing end 91 will sense a pre-energized striker wire 28 and hold the flag out of the viewfinder.

Figure 3:
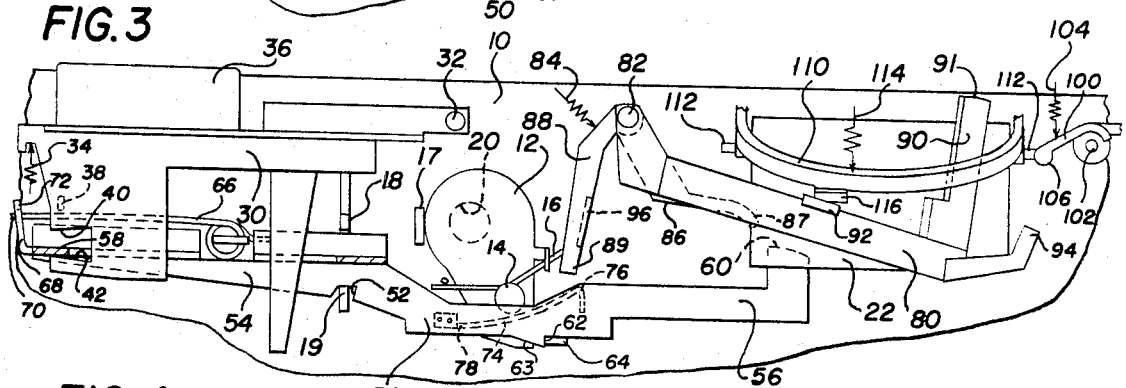
FIG. 3 is a front view of the photographic apparatus in a condition for daylight mode operation without a flashlamp mounted on the apparatus.

Daylight operation of the camera may best be illustrated by reference to FIGS. 3 and 4. In the absence of a flash unit within socket 22, retracting member 110 moves under the bias of spring 114 to bring retracting lug 116 into engagement with retracting surface 92. Spring 114 is stronger than spring 84 and causes movement of firing member 80 in a clockwise direction until sensing and firing arm 90 is held in a retracted position within the camera. Such movement of firing member 80 removes actuating surface 87 from the path of movement of drive lug 60 on release lever 50, thereby insuring that sensing and firing member 80 will not be moved to its firing position in the absence of a flash unit in socket 22. Thus, the force which must be exerted on button 36 by the camera operator would be different for daylight mode operation. This difference is compensated for by the compensating mechanism of the present invention.

Figure 2:
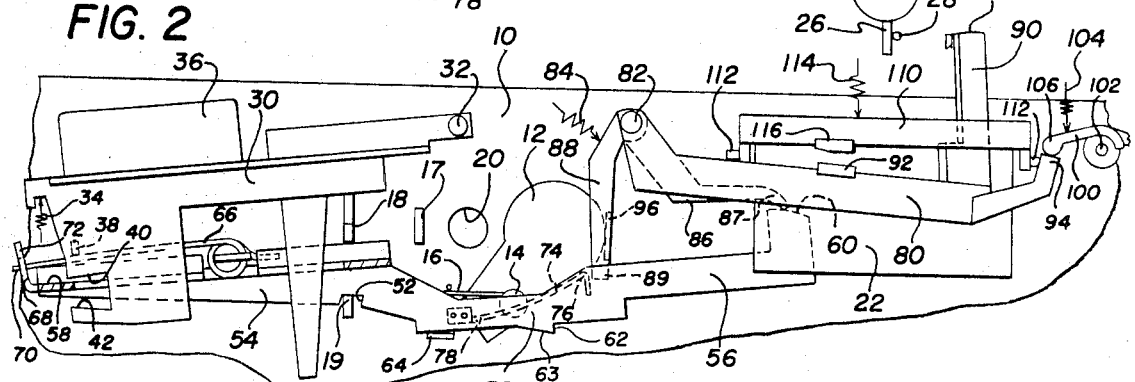
FIG. 2 is a front view of the photographic apparatus of FIG. 1 during actuation of the flash firing and shutter operating mechanism of the photographic apparatus.

As may be seen in FIG. 2, compensating arm 88 has been moved until end 89 is positioned over cantilever end 76 of compensating spring 74 mounted on release lever 50. Upon actuation of body release 30 by the camera operator, lug 38 is moved into engagement with end 70 of spring 66. Movement of body release 30 will be transmitted through spring 66 to release lever 50 until compensating end 89 comes into contact with spring 74. Contact between end 89 and compensating spring 74 adds a force into the system which must be overcome by operator contact with button 36. This force is designed to simulate the force required to release a pre-energized striker wire when a flash unit is present in socket 22. Movement of release lever 50 now ceases and continued movement of body release 30 stores energy within spring 66 until engaging surface 40 comes into engagement with lug 58 on release lever 50. Further movement of body release 30 causes counterclockwise rotation of lever 50 until latch portion 62 releases high energy lever 64. Release of high energy lever 64 permits it to move into engagement with shutter blade 12, thereby driving shutter blade 12 to its aperture uncovering position.

In daylight mode operation exposure is terminated by the presence of stop lug 96 on compensating arm 88. Lug 96 terminates movement of shutter blade 12 prior to full tensioning of spring 16, thereby insuring a shorter exposure time for daylight mode operation of the camera. Shutter blade 12 will be returned to its aperture covering position by means of spring 16. Alternatively, daylight mode exposure may be terminated by a stop member mounted on retracting member 110. Such a stop member would be positioned in the path of movement of blade 12 when a flash unit is inserted in socket 22 and would act to halt movement of blade 12 and permit its early return under the bias of spring 16. Operator release of button 36 will permit clockwise rotation of body release 30 and lever 50 to their initial positions. However, high energy lever 64 will remain in its uncocked position until film advance and cocking operation of the camera is achieved in any conventional manner. During the cocking operation, high energy lever 64 is returned over ramped portion 63 to engagement with latch portion 62. Lever 50 and body release 30 will remain in their initial positions as illustrated in FIG. 3.

The invention has been described in detail with particular reference to a preferred embodiment thereof, but it will be understood that variations and modifications can be effected within the spirit and scope of the invention.

We claim:

1. A camera for use with a photoflash unit, said camera comprising:
   a shutter mechanism;
   means for operating said shutter mechanism;
   means, cooperable with said operating means to receive a force from said operating means, for actuating the photoflash unit in response to receipt of the force from the operating means;
   means for preventing receipt of the force by said actuating means from said operating means; and
   means, cooperable with said operating means to apply to said operating means a compensating force of a predetermined magnitude sufficient to simulate the force received by said actuating means from said operating means, for applying such a compensating force to said operating means in response to prevention of receipt of the force by said preventing means to simulate actuation of the photoflash unit.

2. A camera for use with a photoflash unit, said camera comprising:
   a shutter mechanism;
   means for operating said shutter mechanism;
   means for actuating the photoflash unit;
   means, operable to provide a compensating force, for simulating actuation of the photoflash unit; and
   means for selectively coupling either said actuating means or said simulating means with said shutter operating means.

3. A camera for use with a photoflash unit, said camera comprising:
   a shutter mechanism;
   means for operating said shutter mechanism;
   means engageable by said shutter operating means for actuating the photoflash unit;
   means for preventing engagement of said actuating means by said shutter operating means when the photoflash unit is not to be operated;
   means, engageable by said shutter operating means to apply a compensating force to said shutter operating means, for simulating actuation of the photoflash unit; and
   means for preventing engagement of said simulating means by said shutter operating means when the photoflash unit is to be operated.

4. A camera for use with a flash unit comprising:
   a shutter mechanism;
   means for operating said shutter mechanism;

means for receiving a flash unit;
means, responsive to operation of said shutter operating means, for actuating a received flash unit;
means for disabling said actuating means when no flash unit has been received by said receiving means;
means, engageable by said shutter operating means to apply a compensating force to said shutter operating means, for simulating actuation of a received flash unit; and
means for preventing engagement of said simulating means by said shutter operating means in response to receipt of a flash unit by said receiving means.

5. A camera for use with a flash unit comprising:
a shutter mechanism;
means for operating said shutter mechanism;
means for receiving a flash unit;
means engageable by said operating means for actuating a received flash unit;
means coupled to said receiving means for preventing engagement of said actuating means by said shutter operating means when no flash unit has been received;
means, operable to apply a compensating force to said shutter operating means in response to operation of said shutter operating means, for simulating actuation of a received flash unit; and
means coupled to said receiving means for preventing operation of said simulating means in response to receipt of a flash unit by said receiving means.

6. A camera for use with a flash unit having at least one lamp ignitable by striking and at least one pre-energized striker releasable to effect such striking, said camera comprising:
a shutter mechanism;
means for operating said shutter mechanism;
means for receiving such a flash unit;
means, responsive to said shutter operating means, for releasing a pre-energized striker of a received flash unit;
means for disabling said releasing means when a flash unit has not been received by said receiving means;
means, operable to apply a compensating force to said shutter operating means in response to operation of said shutter operating means, for simulating release of such a pre-energized striker; and
means for preventing operation of said simulating means in response to receipt of a flash unit by said receiving means.

7. A camera for use with a flash unit having at least one lamp ignitable by striking and at least one pre-energized striker releasable to effect such striking, said camera comprising:
a shutter mechanism;
means for operating said shutter mechanism;
means for receiving such a flash unit;
means for sensing and subsequently releasing a pre-energized striker of a received flash unit;
means, responsive to said shutter operating means, for actuating said sensing and releasing means;
means coupled to said receiving means for disabling said actuating means whenever a flash unit has not been received by said receiving means;
means, operable to apply a compensating force to said shutter operating means in response to operation of said shutter operating means, for simulating release of a pre-energized striker; and
means coupled to said receiving means for preventing operation of said simulating means in response to receipt of a flash unit by said receiving means.

8. In a camera adapted for use with a flash unit having at least one flashlamp fireable by striking and at least one pre-energized striker releasable to effect such striking, a compensating mechanism comprising:
means for receiving such a flash unit;
a shutter mechanism;
means for operating said shutter mechanism;
means, responsive to said operating means, for releasing a pre-energized striker of a received unit;
means, operable to apply a compensating force to said shutter operating means in response to operation of said shutter operating means, for simulating release of such a pre-energized striker; and
means coupled to said receiving means to disable said releasing means when no flash unit has been received by said receiving means and to disable said simulating means when a flash unit is received by said receiving means.

9. In a camera adapted for use with a flash unit having at least one flashlamp fireable by striking and at least one pre-energized striker releasable to effect such striking, a compensating mechanism comprising:
a shutter;
means for actuating said shutter;
means for receiving such a flash unit;
means for contacting a pre-energized striker of a received flash unit;
means, responsive to said shutter actuating means, for applying a release force to said contacting means to effect release of a pre-energized striker;
means, operable to apply a compensating force to said force applying means, for simulating the release of such a pre-energized striker;
means for disengaging said simulating means from said force applying means in response to receipt of a flash unit by said receiving means; and
means for disengaging said force applying means from said contacting means when no flash unit has been received by said receiving means.

10. In a camera adapted for use with a flash unit having at least one flashlamp fireable by striking and at least one pre-energized striker releasable to effect such striking, a compensating mechanism comprising:
a shutter;
means for operating said shutter;
means for receiving such a flash unit;
a release member movable into contact with a pre-energized striker;
means coupled to said shutter operating means for applying a release force to said release member to effect release of the contacted pre-energized striker;
means for disabling said coupling means when no flash unit has been received by said receiving means;
means, including a spring operable to apply a compensating force to said shutter operating means, for simulating release of a pre-energized striker; and
means for disabling said simulating means in response to receipt of a flash unit by said receiving means.

* * * * *